US008996592B2

(12) United States Patent
Bardsley et al.

(10) Patent No.: US 8,996,592 B2
(45) Date of Patent: Mar. 31, 2015

(54) METHODS, SYSTEMS, AND COMPUTER PROGRAM PRODUCTS FOR IDENTIFYING A CONTAINER ASSOCIATED WITH A PLURALITY OF FILES

(75) Inventors: Jeffrey S. Bardsley, Durham, NC (US); Mona Singh, Cary, NC (US)

(73) Assignee: Scenera Technologies, LLC, Portsmouth, NH (US)

( * ) Notice: Subject to any disclaimer, the term of this patent is extended or adjusted under 35 U.S.C. 154(b) by 2626 days.

(21) Appl. No.: 11/474,898

(22) Filed: Jun. 26, 2006

(65) Prior Publication Data

US 2007/0299806 A1    Dec. 27, 2007

(51) Int. Cl.
G06F 12/00    (2006.01)
G06F 17/30    (2006.01)

(52) U.S. Cl.
CPC ............................... *G06F 17/30067* (2013.01)
USPC ............................ 707/828; 707/690; 707/694

(58) Field of Classification Search
None
See application file for complete search history.

(56) References Cited

U.S. PATENT DOCUMENTS

| | | | |
|---|---|---|---|
| 6,212,512 B1 * | 4/2001 | Barney et al. ........................ 1/1 |
| 6,751,604 B2 * | 6/2004 | Barney et al. ........................ 1/1 |
| 2002/0184250 A1 * | 12/2002 | Kern et al. .................... 707/204 |
| 2003/0063312 A1 | 4/2003 | Kurimoto et al. |
| 2003/0130993 A1 | 7/2003 | Mendelevitch et al. |
| 2004/0117411 A1 * | 6/2004 | Ueda et al. .................... 707/200 |
| 2004/0148453 A1 | 7/2004 | Watanabe et al. |
| 2005/0044089 A1 | 2/2005 | Wu et al. |
| 2005/0050537 A1 | 3/2005 | Thompson et al. |
| 2005/0063083 A1 | 3/2005 | Dart et al. |
| 2005/0091184 A1 | 4/2005 | Seshadri et al. |
| 2005/0091285 A1 | 4/2005 | Krishnan et al. |
| 2005/0110879 A1 * | 5/2005 | Izume et al. ................ 348/231.2 |
| 2005/0216430 A1 | 9/2005 | Marcjan |
| 2006/0015482 A1 | 1/2006 | Beyer et al. |
| 2006/0123010 A1 * | 6/2006 | Landry et al. .................... 707/10 |
| 2007/0083558 A1 * | 4/2007 | Martinez .................... 707/104.1 |

FOREIGN PATENT DOCUMENTS

| | | |
|---|---|---|
| JP | 2005-109760 | 4/2005 |
| JP | 2005109760 | 4/2005 |

OTHER PUBLICATIONS

"Mac OS X," http://www.apple.com/macosx/, pp. 1-4 (Copyright 2006).
"Max OS X—Spotlight," http://www.apple.com/macosx/features/spotlight/, pp. 1-4 (Copyright 2006).
"Quick File Rename", http://www.skyjuicesoftware.com/software/QuickFileRename/index.html, pp. 1-6 (Copyright 2004-2005).
"Hybrid Taxonomy Platform for Enterprise Content," http://www.content-wire.com/Taxonomies/index.cfm?ccs=82&cs=584, pp. 1-14 (Aug. 8, 2001).

* cited by examiner

*Primary Examiner* — Hexing Liu

(57) ABSTRACT

Methods, systems, and computer program products for identifying a container associated with a plurality of files are disclosed. According to one aspect, a method includes providing for associating a file with a container associated with at least one file to form a plurality of associated files. The prevailing metadata is not required to be from all of the plurality of associated files. Further, the container may be identified based on the prevailing metadata.

34 Claims, 4 Drawing Sheets

METHODS, SYSTEMS, AND COMPUTER PROGRAM PRODUCTS FOR IDENTIFYING A CONTAINER ASSOCIATED WITH A PLURALITY OF FILES

TECHNICAL FIELD

The subject matter described herein relates to identifying a container. More particularly, the subject matter described herein relates to methods, systems, and computer program products for identifying a container associated with a plurality of files.

BACKGROUND

Computer system files may be associated together by an object referred to herein as a container. A computer system may include multiple containers that each associate together one or more files. One example of a container is a file folder that holds one or more files. Another example of a container is a pointer, which may point to one or more files stored in memory. In another example, a container may be a directory that organizes files. In yet another example, a container may be a shortcut, which is a file containing the location of one or more other files stored on a computer.

A container may include an identifier. The identifier may be a series of characters or name that is used to identify a container. Typically, the identifier characters are in the form of a name for providing an indication to a user of the content of the files associated with the container. For example, the container identifier "work project" may indicate that the files associated with the container relate to a work project.

Typically, a container is associated with an identifier when the container is created. The computer system may provide a default identifier when the container is created. An exemplary default identifier may be "New Folder". A user may manually change the identifier for the container to a name that reflects the contents of the container. A user may manually re-identify the container to reflect new or changing content of the container. However, requiring the user to manually re-identify a container each time the container's contents change may result in lost contents. For example, because the re-naming process is manual, the user may forget to change the identifier when the content of a container changes. Because the name of a folder may not reflect its contents, the user may forget where certain contents are stored.

One difficulty with identifiers can occur when the content of a container changes. In some cases, a container identifier may no longer reflect the container's content. For example, images files of a sporting event may be added to container identified with the identifier "vacation" such that the container includes more image files of the sporting event than any other file. In this example, it may be desirable to re-identify the container to an identifier such as "sporting event" in order to reflect the changed content. A user can manually change the container's identifier. However, as stated above, re-identifying the container may be burdensome to the user. Moreover, using conventional methods for identifying folders, a user is required to know enough about the files in the container to identify the container.

Accordingly, in light of the above described difficulties and needs associated with identifying a container, there exists a need for improved methods, systems, and computer program products for identifying a container associated with a plurality of files.

SUMMARY

According to one aspect, the subject matter described herein includes methods, systems, and computer program products for identifying a container associated with a plurality of files. One method includes providing for associating a file with a container associated with at least one file to form a plurality of associated files. The prevailing metadata is not required to be from all of the plurality of associated files. The container is identified based on the prevailing metadata.

As used herein, the term "file" refers to a collection of electronic data or information stored and/or transmitted using a common identifier (such as a file name). Exemplary types of files include data files, text files, program files, directory files, word processing files, image files, video files, spreadsheet files, and the like. A file may be identified (or named) by a sequence of one or more characters.

As used herein, the term "metadata" refers to data or information about a file and associated with the file. Metadata may describe file attributes such as how, when, and/or by whom a file was collected. Further, metadata may describe how the file is formatted. Every file may not have metadata associated with it.

As used herein, the term "container" refers to an association of files. For example, a container may be a digital folder for organizing a plurality of files together. A digital folder may also contain one or more digital sub-folders including one or more files. In another example, a container may be a pointer that points to a plurality of files stored in memory. In yet another example, a container may be a directory for organizing a plurality of files. In another example, a container may be a shortcut, which may be a file containing the location of one or more other files stored on a computer. A container may be identified (or named) by any suitable identifier, such as a sequence of one or more characters.

The subject matter described herein may be implemented using a computer program product comprising computer executable instructions embodied in a computer-readable medium. Exemplary computer-readable media suitable for implementing the subject matter described herein include chip memory devices, disk memory devices, programmable logic devices, and application specific integrated circuits. In addition, a computer-readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings of which.

DETAILED DESCRIPTION

Figure 1:
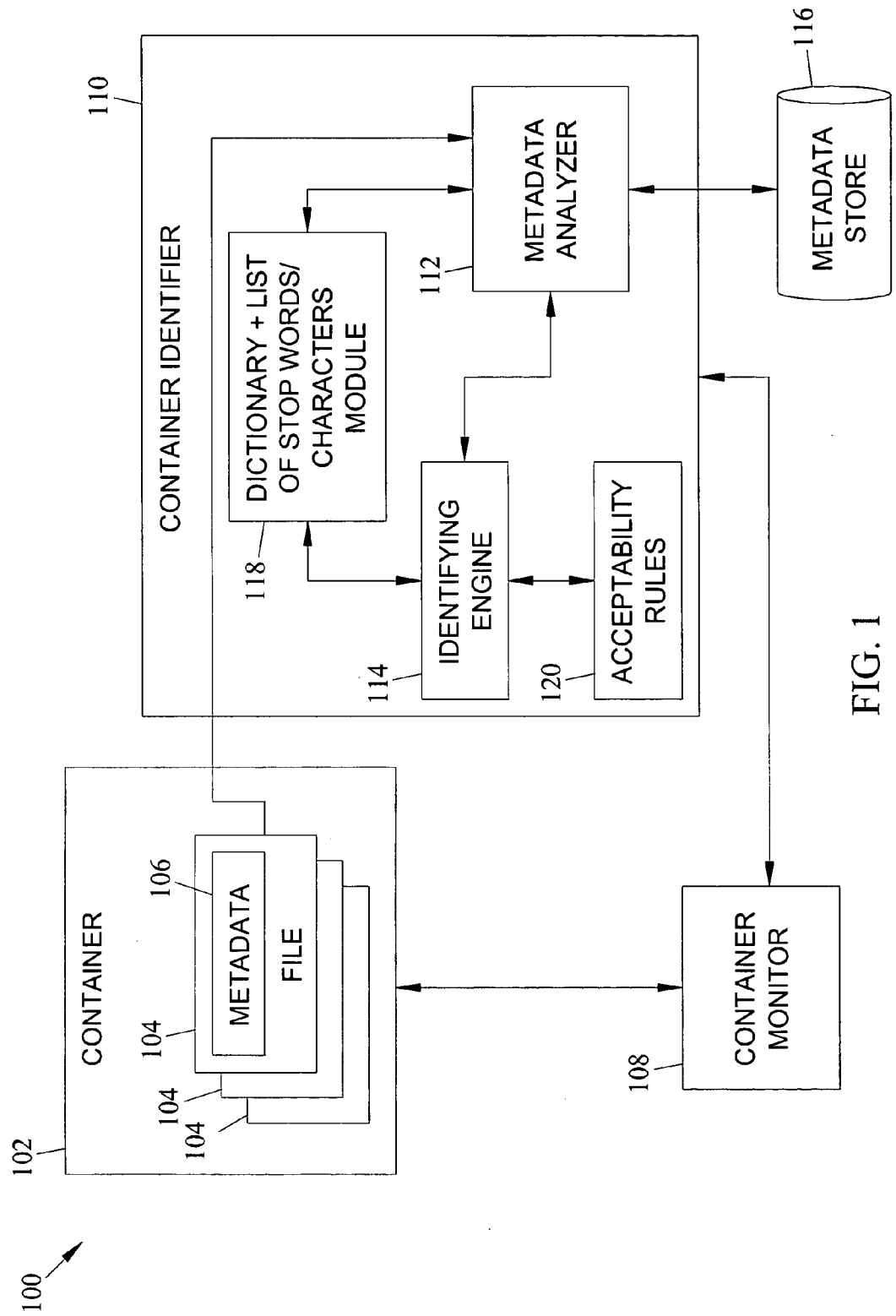
FIG. 1 is a block diagram of an exemplary system configured to identify a container associated with a plurality of files according to an embodiment of the subject matter described herein.

The subject matter described herein includes methods, systems, and computer program products for identifying a container associated with a plurality of files. According to one aspect, a system according to the subject matter described herein may be implemented as hardware, software, and/or firmware components executing on one or more components of a system operable to associate a container with one or more files. FIG. 1 is a block diagram of an exemplary system 100 configured to identify a container 102 associated with a plurality of files 104 according to an embodiment of the subject matter described herein. Files 104 may each be associated with or include metadata 106. Container 102 may be a digital folder configured to associate files 104. Alternatively, container 102 may be a pointer for pointing to one or more locations in a memory where files 104 are stored. In another example, container 102 may be a directory for organizing files together. In yet another example, container 102 may be a shortcut for associating files 104 with one another. Metadata 106 may be associated with files 104 and include data or information about its corresponding file. Although only one container 102 is shown, system 100 may include a plurality of containers. System 100 may be any suitable system, such as a personal computer (PC), a mobile phone, a PDA, a digital camera, a smart phone, and the like, operable to associate one or more files with a container.

System 100 may include means for providing for associating a file with a container associated with at least one file to form a plurality of associated files. For example, system 100 may include a container monitor 108 configured to provide for associating a file with a container associated with at least one file to form a plurality of associated files. Container monitor 108 may receive instructions or commands from a system user or system process to associate a new or preexisting file with container 100, which is associated with one or more files 104. For example, container monitor 108 may place a file into a digital folder identified by a command or instruction received from a user via a user interface, such as a drag-and-drop or copy/paste operation. In another example, container monitor 108 may use a pointer to point to an address of a file. In yet another example, container monitor 108 may organize a file into a directory. Container 102 and files 104 may be identified by a sequence of one or more characters, such as a name. The identifier can be displayed to a user in order to help the user to determine the contents of the files associated with the container.

Metadata 106 may include data or information about a corresponding file 104. Metadata 106 may describe file attributes such as how, when, and/or by whom a file was collected. Further, metadata 106 may describe how the file is formatted. In one example, metadata 106 may include a file name for a corresponding file 104. In another example, metadata 106 may include a file creation time or date for a corresponding file 104. In another example, metadata 106 may include a file author name for a corresponding file 104. In another example, metadata 106 may include a photographer name for an image contained in a corresponding file 104. In another example, metadata 106 may include an image-related tag for an image contained in a corresponding file 104. In another example, metadata 106 may include content within the file, such as text in a text file.

Container monitor 108 may be configured to monitor one or more containers 102. In one example, container monitor 108 may track when containers are associated with files, which could occur concurrently with creation of the container. Further, container monitor 108 may include one or more policies or rules about identifying containers. The policies may be applied when a file is added to a container for determining whether the container is to be re-identified based on the addition of the file. Further, the policies may set forth criteria about the types of containers that can be identified or named. For example, container monitor 108 may include a policy that nested containers or sub-containers cannot be re-identified. In another example, container monitor 108 may determine whether a container is a system container and include a policy that system containers are not re-identified. In this example, container monitor 108 may conduct searches for shortcuts and shared directories including the identifier or name of the container. When a file is added to container 102, container monitor 108 may apply one or more of the policies for determining whether container 102 can be identified. If the container had been previously identified, policies may be applied for determining whether the container can be re-identified.

System 100 may include means for determining prevailing metadata among a plurality of files associated with a container. As used herein, the term "prevailing metadata" refers to metadata common to a majority of files associated with a container, metadata common to a majority of a subset of files associated with the container, and/or metadata descriptive of metadata common to a majority of files or a majority of a subset of files associated with the container. An example of the later includes categories for metadata. For example, metadata for three files added to or associated with a container may be CADILLAC, TOYOTA, and HONDA, and the prevailing metadata can be "cars" or "automobile manufacturers".

Tie-breaking rules, such as maintaining a current container identifier, may be used when different groups of files having common metadata include the same number of files. In one example, a container identifier 110 is configured to determine prevailing metadata among a plurality of files 104 associated with container 102 by analysis of metadata 106 from the plurality of associated files 104. The prevailing metadata may be determined when a file is associated with a container that is associated with at least one file. Container identifier 110 may generate an identifier for container 102 based on prevailing metadata and communicate the identifier to container monitor 108, which may re-identify container 102 using the identifier.

Prevailing metadata may be determined based on one or more of the same or different types of metadata associated with files of a container. In one example, prevailing metadata may be determined based on an analysis of file attributes of files associated with a container. In another example, prevailing metadata may be determined based on an analysis of a format of files associated with a container. In another example, prevailing metadata may be determined based on an analysis of file names of files associated with a container. In another example, prevailing metadata may be determined based on an analysis of file creation times or dates of files associated with a container. In yet another example, prevailing metadata may be determined based on an analysis of file author names of files associated with a container. In another example, prevailing metadata may be determined based on an analysis of photographer names for images contained in files associated with a container. In yet another example, prevailing metadata may be determined based on an analysis of an image-related tag for images contained in files associated with a container. In another example, metadata 106 may be determined based on an analysis of content within the file, such as text in a text file.

Container identifier 110 may include a metadata analyzer 112 and an identifying engine 114 for determining prevailing metadata and an identifier for container 102. Metadata analyzer 112 may be configured to gather and analyze metadata 106 associated with files 104. Container monitor 108 may identify which files 104 are associated with container 102 and indicate the identified files to metadata analyzer 112.

Metadata analyzer 112 may receive the identifications of files 104 from container monitor 108 and may, according to one aspect, perform a lookup in a metadata store 116 for each of the identified files 104 for determining whether metadata store 116 includes metadata for any of the identified files 104. Metadata store 116 may include metadata tables having metadata for files that have been previously analyzed by metadata analyzer 112. As described in further detail below, metadata analyzer 112 may generate metadata tables including metadata for identified files. The generated tables may be stored by metadata store 116. If metadata store 116 includes a metadata table for an identified file 104, metadata analyzer 112 may retrieve the metadata table for the identified file 104. If metadata store 116 does not include a metadata table for an identified file 104, metadata analyzer 112 may generate a metadata table having predetermined metadata for the identified file 104 and store the table in metadata store 116.

Exemplary predetermined metadata that may be generated by metadata analyzer 112 may include a file name. For example, metadata analyzer 112 may extract the entirety or a portion of a file name from an identified file 104 for generating a table for the file. In one embodiment, one or more portions of metadata may be used for determining an identifier for a container. In the example of using a file name for determining an identifier, metadata analyzer 112 may separate a file name to extract individual terms. For example, if the file name is separated by underscores, hyphens, periods, or spaces, metadata analyzer 112 may capture the simple terms by parsing the file name using these special characters as delimiters. Other exemplary metadata that may be extracted by metadata analyzer 112 for generating a table include file attributes, such as image size, standard EXIF information modification date, and any metadata that may be entered by a user or metadata derived from file content.

In one embodiment, a root word in metadata may be extracted for use in creating a metadata table for a file. A dictionary and list of stop words/characters module 118 may determine the roots of terms in the metadata. The determined roots may be used as delimiters. For example, the terms "route," "routing," and "routes" have the root word "route". In this example, the word "route" may be used as the basic metadata term among these terms. Metadata analyzer 112 may communicate metadata terms to module 118 for a determination of root words, if any, for the metadata terms.

In one embodiment, metadata analyzer 112 may use an entirety or a portion of content of a file for deriving metadata. For example, file content, such as file text, file name, author name, date, an index of terms in a file, and the like, may be used for deriving metadata. In the case of image files, wrapper information may be used for deriving metadata. Exemplary metadata that may be derived from an image file includes a creation date of an image, a photographer of an image, a location of an image, a tag added by a user to an image, and a tag added by a system after image analysis.

In one embodiment, metadata analyzer 112 may organize metadata tables according to file type. Each metadata table may include predetermined metadata that may be considered for the type of file in determining prevailing metadata for a container. Further, the predetermined metadata in the table may be ranked according to a preferred order for considering the predetermined metadata. Table 1 below shows exemplary file types and corresponding metadata that may be included in a metadata table.

TABLE 1

Metadata Table Organization and Content

| File Type | Metadata Considered in Order of Preference |
|---|---|
| Text File | 1. File Name |
|  | 2. Index Terms |
|  | 3. Author Name |
|  | 4. Date |
| Image File | 1. File Name |
|  | 2. User-created Tags |
|  | 3. Tags Created by Image Analysis |
|  | 4. Photographer Name |
|  | 5. Location of Image |
|  | 6. Date |
| Media File (e.g., Audio File, Video File, and the like) | 1. File Name |

In order to generate the data illustrated in Table 1, metadata analyzer 112 may extract a file name, index terms, an author name, and/or a date from a text file. Further, in this example, metadata analyzer 112 may extract a file name, user-created tags, tags created by image analysis, a photographer name, a location of an image, and/or a date from an image file. Metadata analyzer 112 may extract a file name from a media file. The predetermined metadata may be considered in order of preference according to the numbering order shown for each file type. For example, file name is the highest ranked metadata for each of the file types shown in Table 1. If a higher ranked metadata type is not available for a file, a lower ranked metadata type may be extracted. For example, in a text file, an author name may be used if a file name and index terms are unavailable for the text file.

Each metadata table may include a frequency for each metadata term that indicates the number of occurrences of the metadata term for the corresponding file. For example, metadata analyzer 112 may generate a metadata table including file name terms and the frequency of their occurrence in each file name.

Identifying engine 114 may determine prevailing metadata among files 104 associated with container 102 by using the metadata tables of files 104. Identifying engine 114 may receive the metadata tables from metadata analyzer 112. Identifying engine 112 may analyze the metadata tables for each file and generate an analysis table including one or more of the metadata terms in the metadata tables and the number of occurrences of each metadata term in the metadata tables. In one embodiment, identifying engine 114 ranks the metadata terms based on number of occurrences. In one example, the analysis table generated by identifying engine 112 may include a percentage (e.g., 10%) of the metadata terms that have the highest occurrence for the metadata tables. In another example, the analysis table generated by identifying engine 112 may include a number (e.g., 10) of metadata terms that have the highest occurrence for the metadata tables.

Identifying engine 114 may determine prevailing metadata for container 102 based on a number of occurrences of like metadata among the plurality of associated files 104. In one embodiment, the metadata with the highest number of occurrences in the analysis table is the prevailing metadata. In another embodiment, different types of metadata may be included in the analysis table and the prevailing metadata may be based on the respective number of occurrences of each metadata. For example, the metadata across all types of metadata that has the highest number of occurrences may be selected as the prevailing metadata.

In another embodiment, prevailing metadata may be determined based on a categorization of metadata among files 104. In one example, metadata from among files 104 may include the terms "Cadillac," "Toyota," and "Honda," which are different brand names of cars or automobile manufacturers. A table may be maintained that includes entries for categorizing a plurality of terms. In this example, the table may categorize the terms as "cars" or "automobile manufacturers". Using the table, the term "cars" or "automobile manufacturers" may be used as an identifier for container 102 or as a term in the metadata table for a determination of prevailing metadata.

Further, identifying engine 114 may apply one or more acceptability rules 120 to metadata terms. An acceptability rule 120 may evaluate a metadata term to determine whether the metadata term is acceptable. Identifying engine 114 may maintain a list of predetermined words that are not acceptable as a container identifier. Prevailing metadata may be compared to the list in order of ranking until a prevailing metadata term is selected that is not on the list. For example, an acceptability rule may specify that adjectives are not acceptable as container identifiers. In this example, identifying engine 114 may include a list of adjectives for comparison against the ranked metadata terms. In another example, an acceptability rule may specify that a root word of a metadata term should be a container identifier. In this example, identifying engine 114 may maintain a table of words and their corresponding root words for comparison against the ranked metadata terms. Further, in this example, the root word for a selected metadata term of the ranked metadata terms will be selected as the container identifier.

In yet another example, a uniqueness of a selected metadata term may be determined based on a comparison with identifiers of other containers. In this example, identifying engine 114 may maintain a list of identifiers for other containers. If there is already a container identified as "patents" and the selected metadata term is "patent" among the ranked metadata terms, the acceptability rules will disallow "patent" as a container identifier and select the next highest ranked metadata term from among the ranked metadata terms.

In another example, if more than one term has the same number of occurrences and the terms are thus ranked equally, the terms may be used together for creating a hyphenated identifier and the terms may be ordered alphabetically. The acceptability rules are applied to the ranked metadata terms in accordance with their rankings until a metadata term is found that meets the requirements of the acceptability rules. The metadata term with the highest number of occurrences and that meets the requirements of the acceptability rules may be selected as the prevailing metadata. Further, the selected prevailing metadata may be communicated to container monitor 108 for use as an identifier for container 102.

System 100 may include means for identifying a container based on the prevailing metadata. In one example, container monitor 108 may be configured to identify container 102 based on the prevailing metadata. As stated above, identifying engine 114 may select a prevailing metadata term and communicate the term to container monitor 108. Container monitor 108 may use the prevailing metadata term as a new identifier for container 102 if container 102 has not been identified. Alternatively, if container 102 has been previously identified, container 102 may be re-identified with the prevailing metadata term.

Figure 2:
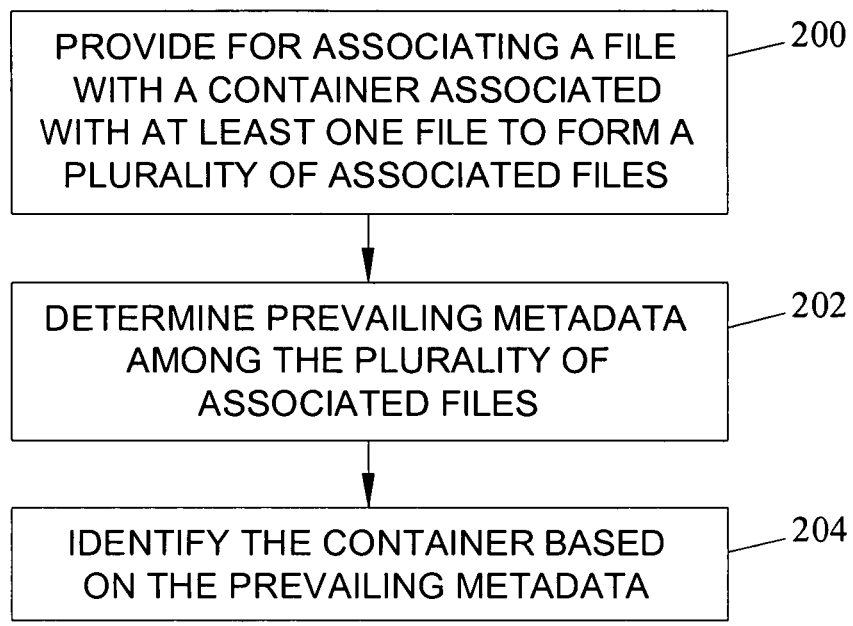
FIG. 2 is a flow chart of an exemplary process for identifying a container associated with a plurality of files according to an embodiment of the subject matter described herein.

FIG. 2 is a flow chart illustrating an exemplary process for identifying a container associated with a plurality of files according to an embodiment of the subject matter described herein. Referring to FIG. 2, in block 200 the process provides for associating a file with a container associated with at least one file to form a plurality of associated files. For example, a process associated with system 100 may allow a user to associate a file folder or other container type with one or more files using, for example, a drag-and-drop operation via a graphical user interface. In block 202, prevailing metadata among the plurality of associated files may be determined. The prevailing metadata may be determined using any of the techniques described above. As stated above, the prevailing metadata is not required to be from all of the plurality of associated files. In block 204, the container is identified based on the prevailing metadata. Identifying the container may include re-naming the container in response to detecting a change in the prevailing metadata.

Figure 3A:
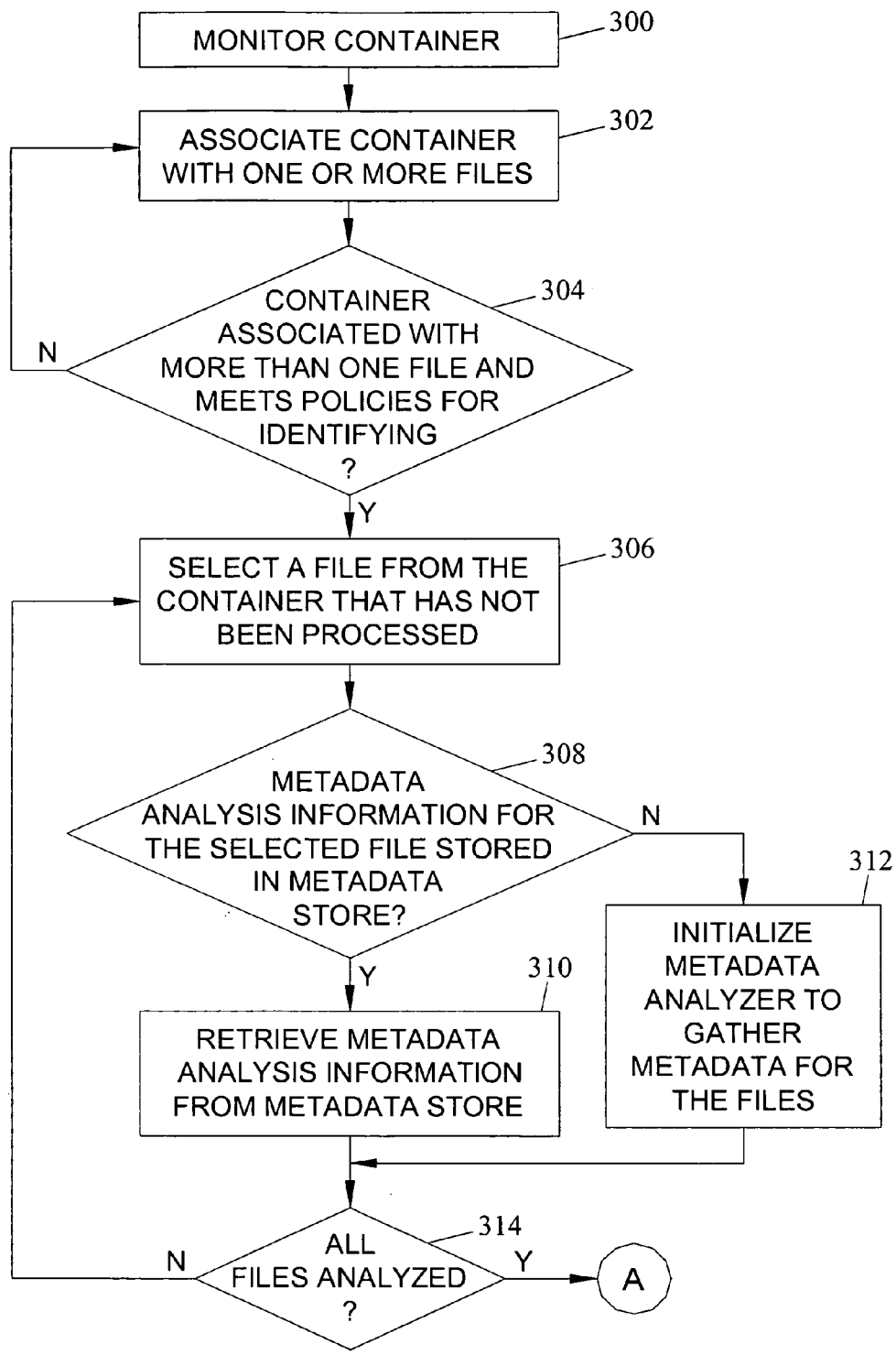
FIGS. 3A and 3B are flow charts of an exemplary process for use by the system shown in FIG. 1 for identifying a container with a plurality of files according to an embodiment of the subject matter described herein.
Figure 3B:
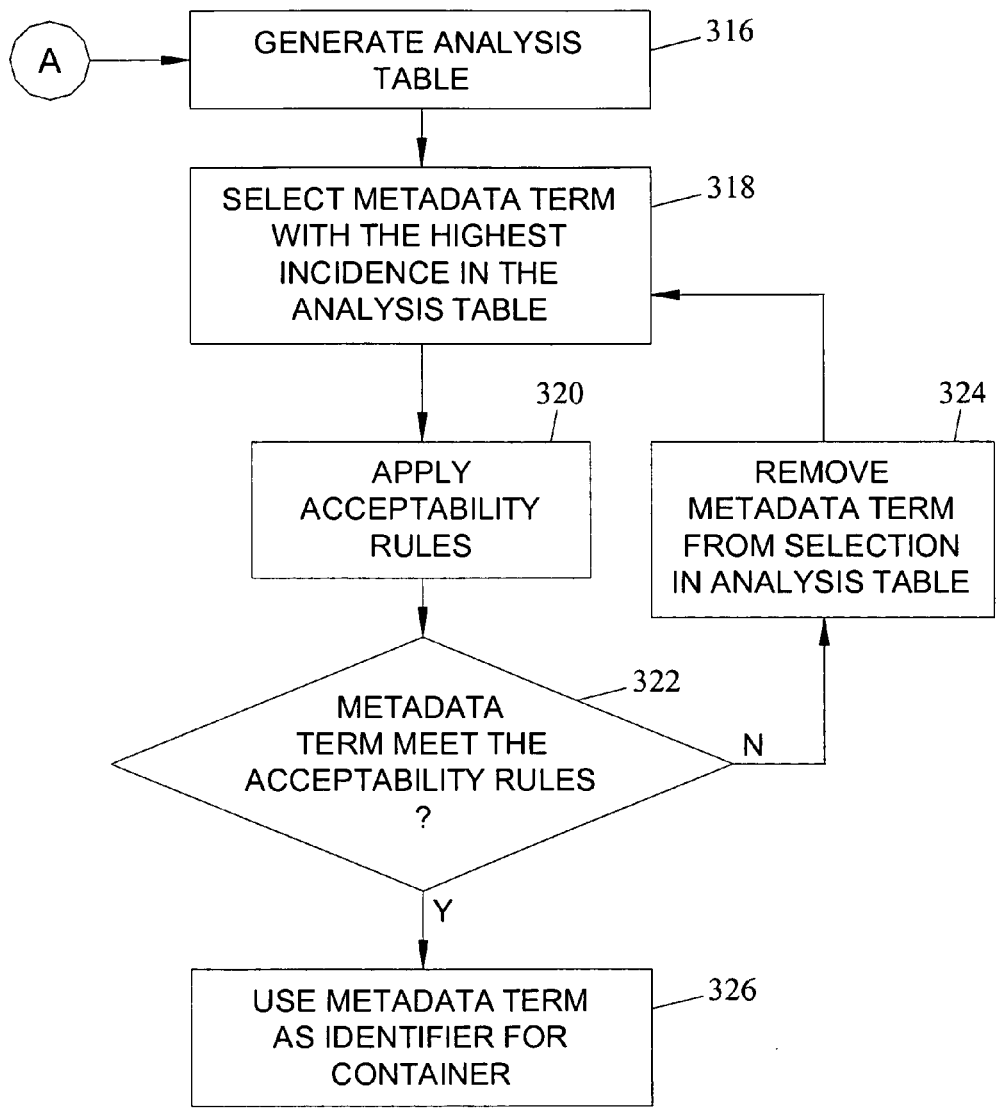

FIGS. 3A and 3B are flow charts illustrating an exemplary process for use by system 100 shown in FIG. 1 for identifying a container with a plurality of files according to an embodiment of the subject matter described herein. Referring to FIG. 3A, system 100 monitors container 102 using container monitor 108 (block 300). In block 302, container 102 may be associated with one or more files 104. Container monitor 114 may determine whether container 102 is associated with more than one file 104 and meets policies for identifying a container (block 304). If it is determined that container 102 is not associated with more than one file 104 and/or does not meet policies for identifying the container, the process may proceed to block 302. Otherwise, if it is determined that container 102 is associated with more than one file 104 and meets policies for identifying the container, the process may proceed to block 306.

In block 306, metadata analyzer 308 may select a file among files 104 in container 102 that has not been processed with respect to identifying container 102. The selected file may be a file recently associated with container 102. For example, the selected file may be a file that has been recently added to a digital folder. In one embodiment, block 306 may be initiated when a new file is associated with container 102 that is associated with at least one other file, such that a plurality of files is formed. Container monitor 108 may identify for container identifier 110 the files that are associated with container 102.

In block 308, metadata analyzer 112 may determine whether metadata analysis information for the file selected in block 306 is stored in metadata store 116. For example, metadata store 116 may include metadata tables having metadata for files that have been previously analyzed by metadata analyzer 112. If it is determined that metadata analysis information for the selected file is stored in metadata store 116, metadata analyzer 112 may retrieve the metadata analysis information from metadata store 116 (block 310).

Otherwise, if it is determined in block 308 that metadata analysis information for the selected file is not stored in metadata store 116, metadata analyzer 112 may generate metadata analysis information for the selected file (block 312). For example, as discussed above, metadata analyzer 112 may generate a metadata table having predetermined metadata for the identified file 104 and store the table in metadata store 116. The metadata analysis information may be generated based on the file type of the selected file.

In block 314, metadata analyzer 112 may determine whether all of the files associated with container 102 have been analyzed. For example, metadata analyzer 112 may determine whether metadata analysis information has been generated and/or collected for all of files 104 associated with container 102. If it is determined that all of the files associated with container 102 have not been analyzed, the process may proceed to block 306. Otherwise, if it is determined that all of the files associated with container 102 have been analyzed, the process may proceed to block 316.

Referring to FIG. 3B, in block 316, identifying engine 114 may generate an analysis table including one or more of the metadata terms among files 104 associated with container 102 and the incidence of the metadata terms among files 104. The analysis table may be generated based on metadata tables of files 104 of container 102.

In block 318, identifying engine 114 may select the metadata term in the analysis table that has the highest incidence. Identifying engine 114 may apply one or more acceptability rules to the selected metadata term (block 320). Further, identifying engine 114 may determine whether the selected metadata term meets the acceptability rules (block 322). If it is determined that the selected metadata term does not meet the acceptability rules, identifying engine 114 removes the selected metadata term from selection in the analysis table (block 324) and the process proceeds to block 318 for selection of the metadata term with the next highest incidence. Otherwise, if it is determined that the selected metadata term meets the acceptability rules, the process may proceed to block 326.

In block 326, the selected metadata term meeting the acceptability rules may be used as an identifier for container 102. Identifying engine 114 may communicate the selected metadata term to container monitor 108, which may identify or re-identify container 102 using the selected metadata term.

In one embodiment, a user may be provided with an option to accept a prevailing metadata term as an identifier for a container. If the user accepts the term, the term may be used as the container. Otherwise, if the user does not accept the term, another metadata term, such as the next highest ranking metadata term in an analysis table, may be presented to the user for optional selection as the container's identifier. Further, if the user does not accept the term, the term may be added to a list of suggested metadata terms. The list of suggested metadata terms may be maintained for comparison against other terms. The system may not use a term in the list of suggested metadata terms, because the list indicates previously rejected terms. Further, if a user accepts a metadata term that was previously used or identifies a container, an indication of the previous use may be provided to a user.

In one embodiment, metadata may be derived from the content of a file for use in identifying a container. For example, a file's metadata may be generated by creating an index of a file document. An index may be created using suitable document processing software. Table 2 below illustrates an exemplary metadata table that may be generated using metadata terms from an index of a file document.

TABLE 2

Metadata Table for the Files of the Container

| Metadata Term | Number of Occurrences |
|---|---|
| Disclosures | 71 |
| Data | 66 |
| Camera | 18 |
| Automatic | 7 |
| Route | 2 |
| Image | 2 |

Each file may be associated with an index that is created based on the file. Further, each index term may have a number of occurrences. The analysis table may be generated by a metadata analyzer and passed to an identifying engine for generating an analysis data for all of the files associated with the container.

In one embodiment, a suggestion may be provided to a user to associate two of more sets or files associated with a single container with two or more containers when there are no overlapping metadata terms between the sets of files. Further, if the user selects the suggestion, the file sets may be divided as suggested into two or more containers, and each container may be identified according to its corresponding prevailing metadata. For example, a container may include first and second groups of files that include pictures of boats and trucks, respectively. The prevailing metadata for the first and second group may be the metadata terms, "boat" and "truck," respectively. If the terms "boat" and "truck" do not overlap in the first and second sets, a suggestion may be provided to the user to divide the first and second groups into two different containers. The container having the metadata term "boat" may be labeled "boat". Likewise, the container having the metadata term "truck" may be labeled "truck". A user may be provided with an option for providing two containers in the manner.

In one embodiment, a container may be a shortcut to another container. The shortcut container may be renamed based on prevailing metadata. Further, system 100 may provide for renaming the other container based on the prevailing metadata by automatically renaming the other container based on the prevailing metadata, querying a user whether to rename the other container, or instructing a user to rename the other container. In one example, a folder may have a shortcut associated with it. In this example, container monitor 108 may determine that the folder has a shortcut associated with it. Further, in this example, when the content of the folder changes and prevailing metadata is determined, system 100 may indicate to a user that the container is a shortcut, determine not to rename the folder because it is a shortcut, or recreate the shortcut with the prevailing metadata as the new identifier of the folder.

In one embodiment, an identifying engine may determine one or more user-preferred naming conventions and maintain a record of the user-preferred naming conventions. The identifying engine can apply the naming conventions for naming or identifying a container. A user-preferred naming convention may be determined based on naming history and patterns of names that a user prefers. For example, the identifying engine may determine that a user does not prefer to use compound names for naming containers. In this example, if the identifying engine determines that the user dislikes compound names for naming containers, the identifying engine may maintain a record of this preference and not name or suggest naming containers using compound names. In another example, the identifying engine may maintain a list of preferred terms for naming containers. In this example, metadata may be matched with the list of preferred terms to identifying prevailing metadata.

In one embodiment, an identifying engine may suggest a plurality of names to a user for naming a container. The user may accept one of the names for naming the container. For example, the identifying engine may determine a plurality of metadata terms in an analysis table based on the number of occurrences of the metadata terms. The metadata terms may be presented to a user for accepting of one or a combination of the terms for naming the container. The user may indicate a user preference for accepting one or a combination of the terms. The system may identify or name the container based on whether one or a combination of the terms is accepted by the user. Further, the system may determine whether a container was previously identified with a name and the previously identified name was changed to another name for determining whether the name is acceptable to a user.

In one embodiment, the identification of a container may be based on a name change history for the container. An identifying engine may determine a name change history for the container and determine whether to rename the container based on the name change history. For example, if an identifier or name of a container is changed frequently, the identifying engine may determine that the container name should not be changed. In one example, the identifying engine may determine whether a predetermined time period has elapsed since the last name change for the container. If the predetermined time period has elapsed, the identifying engine may determine to use prevailing metadata for naming the container. If the predetermined time period has not elapsed, the identifying engine may determine not to change the container's name.

In another embodiment, a user may provide instructions for placing a renaming hold on a container. The renaming hold can be associated with the container and indicate that the container should not be renamed. The identifying engine may determine whether a container is associated with a renaming hold. If the identifying engine determines that the container is associated with a renaming hold, it may not rename the container.

Example of Identifying a Container

In one example of identifying a container according to the subject matter described herein, a container may include files with the following file names:
Photo-planning-and-tracking.doc
Automatic-peer-to-peer-route.doc
Automatically routing images-v1
History-Routes
Creating Familiar routes
Automatically routing images-v2

A process for identifying the container may be initiated when one or more of the files are associated with the container.

Initially, it is determined whether the container meets policies for identifying a container. If the policies are not met, the container may not be identified and the process may stop. Otherwise, if the policies are met, metadata tables may be generated for each of the files. A metadata table may include one or more metadata terms and number of occurrences for each of the metadata terms.

Table 3 below shows an example of content in a metadata table for the file having the file name "Photo-planning-and-tracking.doc".

TABLE 3

Metadata Table for File Named
"Photo-planning-and-tracking.doc"

| Metadata Term | Number of Occurrences |
| --- | --- |
| Photo | 1 |
| Plan | 1 |
| Track | 1 |

Table 3 is generated by separating terms in the file name from one another by each file name's hyphens and removing the hyphens. Further, the suffix ".doc" after the period is removed. The remaining terms are "Photo," "Planning," "and," and "tracking". The terms may be compared to a list for removing common words such as the word "and". Next, the remaining terms may be compared to a list of root words for determining root words among the terms. The term "photo" is a root word. The terms "planning" and "tracking" correspond to the root words "plan" and track," respectively. The resulting words and corresponding number of occurrences are shown in the metadata table shown in Table 3.

Table 4 below shows an example of content in a metadata table for the file having the file name "automatic-peer-to-route.doc".

TABLE 4

Metadata Table for File Named
"automatic-peer-to-route.doc"

| Metadata Term | Number of Occurrences |
| --- | --- |
| Automatic | 1 |
| Peer | 2 |
| route | 1 |

Table 4 is generated by separating terms in each file name from one another by the file name's hyphens and removing the hyphens. Further, the suffix ".doc" after the period is removed. The remaining terms are "Automatic," "peer," "to," and "route". The terms may be compared to a list for removing common words such as the word "to". Next, the remaining terms may be compared to a list of root words for determining root words among the terms. All of the words are root words. The resulting words and corresponding number of occurrences are shown in the metadata table shown in Table 4.

Metadata tables for each of the other files may be generated or obtained from a metadata store. Next, an analysis table may be generated including an aggregate of the data from the metadata tables. Table 5 below shows an example of content in an analysis table for the files of the container.

TABLE 5

Analysis Table for the Files of the Container

| Metadata Terms Ranked by Number of Occurrences | Number of Occurrences |
| --- | --- |
| Route | 5 |
| Automatic | 3 |
| Image | 2 |
| Peer | 2 |
| History | 1 |
| Plan | 1 |
| Create | 1 |
| Track | 1 |
| Photo | 1 |
| Familiar | 1 |
| v1 | 1 |
| v2 | 1 |
| History | 1 |

The metadata table includes a ranking by a number of occurrences for each metadata term contained in the metadata tables for the container and the number of occurrences for the metadata terms. The metadata term "route" has the highest number of occurrences among the metadata terms. The acceptability rules may be applied to metadata term "route". If the term "route" meets the requirements of the acceptability rules, the container may be identified using the identifier "route". Otherwise, the acceptability rules may be applied to the metadata terms in order according to ranking until a term meeting the requirements is found. The highest ranking metadata term that meets the acceptability rules may be used as the identifier for the container.

Example of Identifying a Container

In one example of identifying a container according to the subject matter described herein, a container may include files with the following file names:
  Photo-planning-and-tracking-disclosure.doc
  automatic-peer-to-peer-route-disclosure.doc
  disclosure-Automatically routing images-v1
  disclosure-History-routes
  Creating Familiar routes
  Disclosure-Automatically routing images-v2
A process for identifying the container may be initiated when one or more of the files are associated with the container.

Initially, it is determined whether the container meets policies for identifying a container. If the policies are not met, the container may not be identified and the process may stop. Otherwise, if the policies are met, metadata tables may be generated for each of the files. A metadata table may include one or more metadata terms and number of occurrences for each of the metadata terms. Next, an analysis table may be generated including an aggregate of the data from the metadata tables.

Table 6 below shows an example of content in an analysis table for the files of the container.

TABLE 6

Analysis Table for the Files of the Container

| Metadata Terms Ranked by Number of Occurrences | Number of Occurrences |
|---|---|
| Disclosure | 5 |
| Route | 5 |
| Automatic | 3 |
| Image | 2 |
| Peer | 1 |
| History | 1 |
| Plan | 1 |
| Create | 1 |
| Track | 1 |
| Photo | 1 |
| Familiar | 1 |
| v1 | 1 |
| v2 | 1 |
| History | 1 |

The analysis table includes a ranking by a number of occurrences for each metadata term contained in the metadata tables for the container and the number of occurrences for the metadata terms. The metadata terms "disclosure" and "route" have the highest number of occurrences among the metadata terms. The acceptability rules may be applied to metadata terms "disclosure" and "route". If both terms meet the requirements of the acceptability rules, the container may be identified using one of identifiers "disclosure-route" and "route-disclosure". The container monitor may select "disclosure-route" in alphabetical order as the identifier for the container. If either of the terms do not meet the acceptability rules, the other may be selected if the term meets the rules. If neither term meets the acceptability rules, the rules may be applied to the metadata terms in order according to ranking until a term meeting the requirements is found. The highest ranking metadata term that meets the acceptability rules may be used as the identifier for the container. In another example, two different terms in a metadata table may be used if the number of occurrences of the terms is close to one another.

Example of Identifying a Container

In one example of identifying a container according to the subject matter described herein, a user may upload image files that have been recently taken and associate the image files with a container. Based on the file type, metadata may be generated for the image files in the container. The pictures were taken on a vacation to Paris. The user may manually name the container with an identifier such as "Paris" or "Paris Photos". Next, the user may upload images taken on a trip to Normandy to the container. The system may analyze the location data of the Normandy images and determine that the location of the images does not match the name of the container. Metadata from the Normandy images may be used for renaming the container. The container may be renamed by performing a lookup in a stored ontology. Based on the lookup, the system may determine that Paris and Normandy are within France. The system may determine that to use a combination of "Paris" and "Normandy," such as the name "Paris-Normandy," to name the container. Later, the user may upload images from Strasbourg such that its metadata is "Strasbourg". A naming rule may disallow using more than one hyphen. The system may determine the name "France" from an ontology since it is a term that encompasses all of the terms "Paris," "Normandy," and "Strasbourg". The container may automatically be named "France". Alternatively, the name "France" may be presented to the user as a suggested name for the container.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for identifying a container associated with a plurality of files, the method comprising:
  providing for associating a file with a container associated with at least one file to form a plurality of associated files;
  determining prevailing metadata among the plurality of associated files including applying one or more acceptability rules to the metadata of the plurality of associated files to qualify use of the metadata for identifying the container including associating a plurality of different metadata among the plurality of associated files with a respective number of occurrences of each metadata and ranking the associated metadata based on the respective number of occurrences of each metadata, wherein the prevailing metadata is not required to be from all of the plurality of associated files; and
  identifying the container based on the prevailing metadata, wherein the container is an existing container and identifying the container based on the prevailing metadata includes renaming the existing container based on the prevailing metadata and wherein at least one of the preceding actions is performed on at least one electronic hardware component.

2. The method of claim 1 wherein applying one or more acceptability rules to the metadata includes excluding metadata for use in identifying the container based on the one or more acceptability rules.

3. The method of claim 1 wherein identifying the container based on the prevailing metadata includes:
   determining whether the at least one name is acceptable to a user; and
   renaming the existing container based on whether the at least one name is acceptable to the user.

4. The method of claim 3 wherein determining whether the name is acceptable to a user comprises:
   prompting a user with the at least one determined name for the existing container; and
   receiving a user preference indicating at least one of an acceptable name among the at least one determined name and an alternate name.

5. The method of claim 3 wherein determining whether the name is acceptable to a user includes determining whether the existing container was previously identified with the name and the previously identified name was changed to another name.

6. The method of claim 1 wherein identifying the container based on the prevailing metadata includes renaming the existing container based on a plurality of different metadata among the plurality of associated files.

7. The method of claim 1 wherein providing for associating a file with a container includes providing for associating a file comprising one of an image file, an audio file, a video file, a word processing file, and a text file.

8. The method of claim 1 wherein providing for associating a file with a container includes providing for associating a file with a container comprising one of a digital folder, a shortcut, a pointer for associating the plurality of associated files, and a directory.

9. The method of claim 1 wherein determining prevailing metadata among the plurality of associated files includes determining the prevailing metadata based on a number of occurrences of like metadata among the plurality of associated files.

10. A method for identifying a container associated with a plurality of files, the method comprising:
    providing for associating a file with a container associated with at least one file to form a plurality of associated files;
    determining prevailing metadata among the plurality of associated files including applying one or more acceptability rules to the metadata of the plurality of associated files to qualify use of the metadata for identifying the container, wherein the prevailing metadata is not required to be from all of the plurality of associated files; and
    identifying the container based on the prevailing metadata, wherein the container is an existing container and identifying the container based on the prevailing metadata comprises:
    determining a name change history for the existing container;
    determining whether to rename the existing container based on the name change history; and
    renaming the existing container based on the prevailing metadata,
    wherein at least one of the preceding actions is performed on at least one electronic hardware component.

11. The method of claim 10 wherein identifying the container based on the prevailing metadata comprises:
    determining whether a renaming hold is associated with the existing container, the renaming hold indicating that the existing container should not be renamed; and
    determining whether to rename the existing container based on the renaming hold determination.

12. The system of claim 10 wherein the container identifier is configured to determine the prevailing metadata based on a number of occurrences of like metadata among the plurality of associated files.

13. The method of claim 10 wherein determining prevailing metadata among the plurality of associated files includes determining one or more of a prevailing file name among the plurality of associated files, a prevailing file creation date among the plurality of associated files, a prevailing file author name among the plurality of associated files, a prevailing photographer name among the plurality of associated files, a prevailing image-related tag attached by a user among the plurality of associated files, a prevailing file attribute among the plurality of associated files, and a prevailing portion or entirety of content among the plurality of associated files.

14. The method of claim 10 wherein identifying the container based on the prevailing metadata includes determining a user-preferred naming convention and renaming the existing container using the user-preferred naming convention.

15. A method for identifying a container associated with a plurality of files, the method comprising:
    providing for associating a file with a container associated with at least one file to form a plurality of associated files;
    determining prevailing metadata among the plurality of associated files including applying one or more acceptability rules to the metadata of the plurality of associated files to qualify use of the metadata for identifying the container, wherein the prevailing metadata is not required to be from all of the plurality of associated files; and
    identifying the container based on the prevailing metadata, wherein the container is an existing container and identifying the container based on the prevailing metadata includes renaming the existing container based on the prevailing metadata;
    suggesting to a user that one or more of the plurality of files be associated with another container; and
    suggesting an identity for the other container based on the prevailing metadata,
    wherein at least one of the preceding actions is performed on at least one electronic hardware component.

16. The method of claim 15 wherein determining prevailing metadata among the plurality of associated files includes determining the prevailing metadata based on a categorization of metadata among the plurality of associated files.

17. The method of claim 15 wherein identifying the container based on the prevailing metadata comprises:
    renaming the existing container based on the prevailing metadata, the existing container being a shortcut to another container; and
    providing for renaming the other container based on the prevailing metadata.

18. A system for identifying a container associated with a plurality of files, the system comprising system components including:
    at least one processor;
    memory containing software executable by the at least one processor, whereby the system is operative to:
    provide for associating a file with a container associated with at least one file to form a plurality of associated files;
    provide for associating a file with a container associated with at least one file to form a plurality of associated files;
    determine prevailing metadata among the plurality of associated files including applying one or more acceptability rules to the metadata of the plurality of associated files to qualify use of the metadata for identifying the container including associating a plurality of different metadata among the plurality of associated files with a respective number of occurrences of each metadata and ranking the associated metadata in the table based on the respective number of occurrences of each metadata, and determining prevailing metadata based on the respective number of occurrences of each metadata wherein the prevailing metadata is not required to be from all of the plurality of associated files; and identify the container based on the prevailing metadata, wherein the container is an existing container and identifying the container based on the prevailing metadata includes renaming the existing container based on the prevailing metadata.

19. The system of claim 18 wherein the system is operative to exclude metadata for use in identifying the container based on the one or more acceptability rules.

20. The system of claim 18 wherein the system is operative to name the existing container based on a plurality of different metadata among the plurality of associated files.

21. The system of claim 18 wherein the container identifier is configured to provide for associating a file comprising one of an image file, an audio file, a video file, a word processing file, and a text file.

22. The system of claim 18 wherein the container identifier is configured to provide for associating a file with a container comprising one of a digital folder, a shortcut, a pointer for associating the plurality of associated files, and a directory.

23. A system for identifying a container associated with a plurality of files, the system comprising system components including:

at least one processor;

memory containing software executable by the at least one processor, whereby the system is operative to:

provide for associating a file with a container associated with at least one file to form a plurality of associated files;

determine prevailing metadata among the plurality of associated files including applying one or more acceptability rules to the metadata of the plurality of associated files to qualify use of the metadata for identifying the container, wherein the prevailing metadata is not required to be from all of the plurality of associated files;

identify the container based on the prevailing metadata, wherein the container is an existing container and identifying the container based on the prevailing metadata includes renaming the existing container based on the prevailing metadata;

determine a name change history for the existing container; and determine whether to rename the existing container based on the name change history.

24. The system of claim 23 wherein the system is further operative to:

determine whether a renaming hold is associated with the existing container, the renaming hold indicating that the existing container should not be renamed; and determine whether to rename the existing container based on the renaming hold determination.

25. The system of claim 23 wherein the container identifier is configured to determine one or more of a prevailing file name among the plurality of associated files, a prevailing file creation date among the plurality of associated files, a prevailing file author name among the plurality of associated files, a prevailing photographer name among the plurality of associated files, a prevailing image-related tag attached by a user among the plurality of associated files, a prevailing file attribute among the plurality of associated files, and a prevailing portion or entirety of content among the plurality of associated files.

26. The system of claim 23 wherein the system is operative to determine a user-preferred naming convention and configured to rename the existing container using the user-preferred naming convention.

27. The system of claim 23 wherein the system is operative to:

determine at least one name for the existing container based on the prevailing metadata;

determine whether the at least one name is acceptable to a user; and rename the existing container based on whether the at least one name is acceptable to the user.

28. The system of claim 27 wherein the system is operative to:

prompt a user with the at least one determined name for the existing container; and receive a user preference indicating at least one of an acceptable name among the at least one determined names and an alternate name.

29. The system of claim 27 wherein the system is operative to determine whether the existing container was previously identified with the name and the previously identified name was changed to another name.

30. A system for identifying a container associated with a plurality of files, the system comprising system components including:

at least one processor;

memory containing software executable by the at least one processor, whereby the system is operative to:

provide for associating a file with a container associated with at least one file to form a plurality of associated files;

determine prevailing metadata among the plurality of associated files including applying one or more acceptability rules to the metadata of the plurality of associated files to qualify use of the metadata for identifying the container, wherein the prevailing metadata is not required to be from all of the plurality of associated files;

identify the container based on the prevailing metadata, wherein the container is an existing container and identifying the container based on the prevailing metadata includes renaming the existing container based on the prevailing metadata;

suggest to a user that one or more of the plurality of files be associated with another container; and suggest an identity for the other container based on the prevailing metadata.

31. The system of claim 30 wherein the container identifier is configured to determine the prevailing metadata based on a categorization of metadata among the plurality of associated files.

32. The system of claim 30 wherein the system is operative to:

rename the existing container based on the prevailing metadata, the existing container being a shortcut to another container; and provide for renaming the other container based on the prevailing metadata.

33. A system for identifying a container associated with a plurality of files, the system comprising:
- means for providing for associating a file with a container associated with at least one file to form a plurality of associated files;
- means for determining prevailing metadata among the plurality of associated files including applying one or more acceptability rules to the metadata of the plurality of associated files to qualify use of the metadata for identifying the container, wherein the prevailing metadata is not required to be from all of the plurality of associated files; and
- means for identifying the container based on the prevailing metadata, wherein the container is an existing container and identifying the container based on the prevailing metadata includes renaming the existing container based on the prevailing metadata;
- means for suggesting to a user that one or more of the plurality of files be associated with another container; and
- means for suggesting an identity for the other container based on the prevailing metadata, and wherein at least one of the means includes at least one electronic hardware component.

34. A non-transitory computer-readable storage medium storing computer executable instructions for performing steps comprising:
- providing for associating a file with a container associated with at least one file to form a plurality of associated files;
- determining prevailing metadata among the plurality of associated files including applying one or more acceptability rules to the metadata of the plurality of associated files to qualify use of the metadata for identifying the container, wherein the prevailing metadata is not required to be from all of the plurality of associated files; and
- identifying the container based on the prevailing metadata, wherein the container is an existing container and identifying the container based on the prevailing metadata includes renaming the existing container based on the prevailing metadata;
- suggesting to a user that one or more of the plurality of files be associated with another container; and
- suggesting an identity for the other container based on the prevailing metadata.

* * * * *